(12) United States Patent
Glöckner et al.

(10) Patent No.: US 11,981,194 B2
(45) Date of Patent: May 14, 2024

(54) METHOD FOR OPERATING A DRIVETRAIN FOR A WORK MACHINE, DRIVETRAIN FOR A WORK MACHINE, AND WORK MACHINE

(71) Applicant: ZF FRIEDRICHSHAFEN AG, Friedrichshafen (DE)

(72) Inventors: Rico Glöckner, Pocking (DE); Lukas Jäger, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 38 days.

(21) Appl. No.: 17/762,375

(22) PCT Filed: Sep. 21, 2020

(86) PCT No.: PCT/EP2020/076284
§ 371 (c)(1),
(2) Date: Mar. 22, 2022

(87) PCT Pub. No.: WO2021/058429
PCT Pub. Date: Apr. 1, 2021

(65) Prior Publication Data
US 2022/0396137 A1    Dec. 15, 2022

(30) Foreign Application Priority Data
Sep. 23, 2019 (DE) .................. 10 2019 214 412.8

(51) Int. Cl.
*B60K 17/06* (2006.01)
*B60K 1/02* (2006.01)
(Continued)

(52) U.S. Cl.
CPC ............... *B60K 1/02* (2013.01); *B60K 17/02* (2013.01); *B60K 17/06* (2013.01); *B60K 17/356* (2013.01);
(Continued)

(58) Field of Classification Search
CPC .......... B60K 1/02; B60K 17/02; B60K 17/06; B60K 17/356; B60K 17/28; B60K 23/00;
(Continued)

(56) References Cited

U.S. PATENT DOCUMENTS 7,540,823 B2 * 6/2009 Kilian ..................... B60K 6/40
477/3
10,935,111 B2 * 3/2021 Lindenmaier ............. H02P 6/04
(Continued)

FOREIGN PATENT DOCUMENTS

CN        103453120 A      12/2013
CN        106828064 A       6/2017
(Continued)

OTHER PUBLICATIONS

Machine translation of JP 2013141875 A (Year: 2013).*

*Primary Examiner* — Jacob S. Scott
*Assistant Examiner* — Farhana Pervin
(74) *Attorney, Agent, or Firm* — LEYDIG, VOIT & MAYER, LTD.

(57) ABSTRACT

A method for operating a drive train for a mobile machine, including a first electric motor driving a working drive of the mobile machine via a first transmission arrangement, and a second electric motor driving a propulsion drive of the mobile machine via a second transmission arrangement, wherein a rotational speed of the second electric motor increases during a shifting operation of the second transmission arrangement out of a higher gear stage into a lower gear stage, and wherein during the shifting operation, a drive connection is established via a first clutch between the first electric motor and the propulsion drive, such that the propulsion drive is driven by the first electric motor during the shifting operation.

15 Claims, 2 Drawing Sheets

(51) Int. Cl.
　　　*B60K 17/02*　　　(2006.01)
　　　*B60K 17/356*　　(2006.01)
(52) U.S. Cl.
　　　CPC ....... *B60Y 2200/22* (2013.01); *B60Y 2200/41* (2013.01)
(58) Field of Classification Search
　　　CPC .. B60Y 2200/22; B60Y 2200/41; Y02T 10/62
　　　See application file for complete search history.

(56) References Cited

U.S. PATENT DOCUMENTS

| 2002/0148144 | A1  | 10/2002 | Tokunaga   |           |
|--------------|-----|---------|------------|-----------|
| 2005/0284671 | A1* | 12/2005 | Tatara     | B60L 58/15 |
|              |     |         |            | 180/24.06 |
| 2011/0042155 | A1* | 2/2011  | Tarasinski | B60K 6/48 |
|              |     |         |            | 903/902   |
| 2015/0210266 | A1* | 7/2015  | Yang       | B60K 6/442 |
|              |     |         |            | 180/65.23 |
| 2016/0272241 | A1  | 9/2016  | Sonnenburg et al. | |
| 2020/0391582 | A1* | 12/2020 | Serrao     | B60K 23/02 |
| 2020/0391589 | A1* | 12/2020 | Azuma      | B60K 17/02 |
| 2022/0176802 | A1* | 6/2022  | Forte      | B60K 6/387 |
| 2022/0307595 | A1* | 9/2022  | Amboji     | F16H 47/02 |

FOREIGN PATENT DOCUMENTS

| DE | 10216308 A1      | 11/2002 |
| DE | 102010063503 A1  | 6/2012  |
| DE | 102012204717 A1  | 9/2013  |
| DE | 202014000738 U1  | 3/2014  |
| DE | 102013204672 A1  | 9/2014  |
| EP | 0962597 A2       | 12/1999 |
| JP | 2013141875 A     | 7/2013  |
| JP | 2013141955 A     | 7/2013  |

* cited by examiner

METHOD FOR OPERATING A DRIVETRAIN FOR A WORK MACHINE, DRIVETRAIN FOR A WORK MACHINE, AND WORK MACHINE

CROSS REFERENCE TO RELATED APPLICATIONS

This application is a U.S. National Phase application under 35 U.S.C. § 371 of International Application No. PCT/EP2020/076284, filed on Sep. 21, 2020, and claims benefit to German Patent Application No. DE 10 2019 214 412.8, filed on Sep. 23, 2019. The International Application was published in German on Apr. 1, 2021 as WO 2021/058429 under PCT Article 21(2).

FIELD

The present invention relates to a method for operating a drivetrain for a mobile machine in accordance with the preamble of claim 1, to a drive train for a mobile machine in accordance with the preamble of claim 8, and to a corresponding mobile machine.

BACKGROUND

Electrically driven mobile machines, such as for instance wheel loaders, skid steer loaders, telescopic handlers, dumper trucks or else excavators, are known in the prior art. Electrically driven mobile machines of this type are either driven purely electrically, that is to say they have exclusively an electric battery or an electric accumulator for their energy supply; or else they are driven in a diesel-electric manner, which means that the required energy is provided by a diesel-operated generator, usually in conjunction with an electrical buffer store, such as, for example, a capacitor of corresponding dimensions. In each case, the mechanical power output which is required for the propulsion drive and the working drive is delivered by one or more electric motors. Furthermore, hybrid electric mobile machines are also known, in the case of which the required mechanical power output is delivered primarily by an internal combustion engine, usually a diesel engine. An additionally provided electric motor typically takes over what is known as a boost function here.

Power-shift transmissions for mobile machines are likewise known, in the case of which rotational speed synchronizing between the rotational speed of a drive unit and the rotational speed of the gear stage to be engaged takes place during a shifting operation. In the case of an upshift operation, the rotational speed of the drive unit is correspondingly reduced, and is correspondingly increased in the case of a downshift.

In this context, DE 20 2014 000 738 U1 describes a wheel loader which is driven purely by electric motor and comprises a first electric motor for a propulsion drive and a second electric motor for a working drive.

EP 0 962 597 A2 has disclosed a battery-operated mobile machine which comprises two electric motors for the propulsion drive and comprises a further electric motor for the working drive. The two electric motors for the propulsion drive are integrated into the front axle, each electric motor driving one wheel.

Furthermore, DE 10 2010 063 503 A1 has disclosed a multistep transmission of a mobile machine of planetary design. The multistep transmission comprises a housing, in which four planetary sets and a plurality of shafts are received, and shifting elements which are formed by way of at least one brake and clutches, and by means of the targeted actuation of which eight different transmission ratios can be produced between a drive shaft and an output shaft. The transmission of DE 10 2010 063 503 A1 makes a power-shift capability possible.

The known electrically driven mobile machines are afflicted by disadvantages, however, in so far as rotational speed synchronizing of the involved gear stages is made difficult in the case of a shifting operation under power, in particular in the case of a traction downshift, in comparison with an identical shifting operation in the case of a mobile machine operated by internal combustion engine. The cause for this lies firstly in the comparatively greater moment of inertia of an electric motor with respect to an internal combustion engine, but above all in the considerably greater rotational speed spectrum of the electric motor, as a result of which even comparatively higher differential rotational speeds can exist. This usually makes correspondingly greater and more powerful dimensioning of the clutches in electrically driven mobile machines necessary. A comparatively greater and more powerful design of this type of the clutch necessitates, however, an increased installation space requirement, an increased weight and increased production costs. Furthermore, comparatively greater clutches also have comparatively greater drag torques and friction losses.

SUMMARY

In an embodiment, the present disclosure provides a method for operating a drive train for a mobile machine, comprising a first electric motor driving a working drive of the mobile machine via a first transmission arrangement, and a second electric motor driving a propulsion drive of the mobile machine via a second transmission arrangement, wherein a rotational speed of the second electric motor increases during a shifting operation of the second transmission arrangement out of a higher gear stage into a lower gear stage, and wherein during the shifting operation, a drive connection is established via a first clutch between the first electric motor and the propulsion drive, such that the propulsion drive is driven by the first electric motor during the shifting operation.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
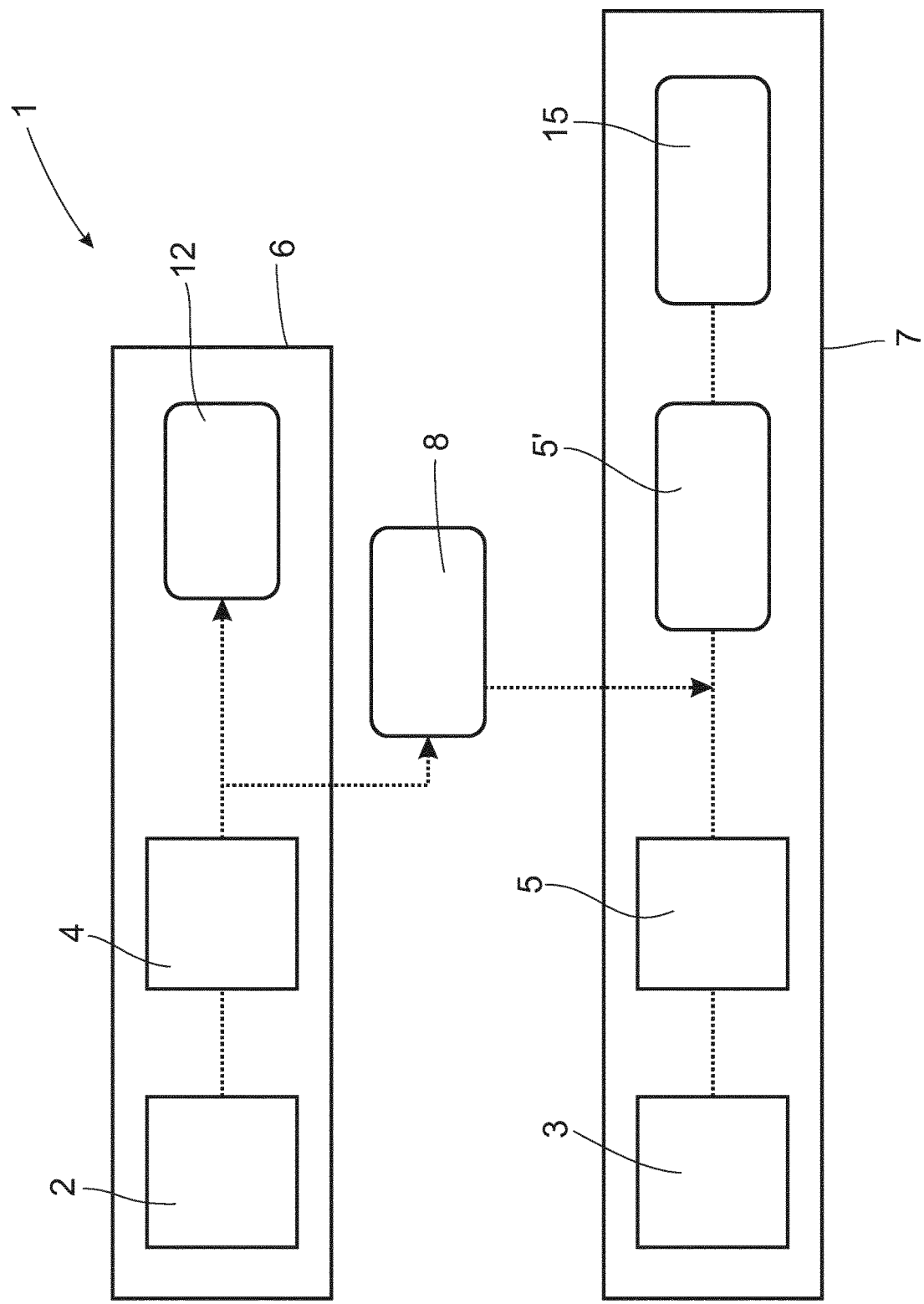
FIG. 1 shows by way of example and diagrammatically one possible embodiment of a drive train according to the invention for a mobile machine.

It is an object of the invention to propose an improved method for operating a drive train for a mobile machine.

According to the invention, this object is achieved by way of the method for operating a drive train for a mobile machine as claimed in claim 1. Advantageous refinements and developments of the invention arise from the dependent claims.

The invention relates to a method for operating a drive train for a mobile machine, a first electric motor driving a working drive of the mobile machine via a first transmission arrangement, a second electric motor driving a propulsion drive of the mobile machine via a second transmission arrangement, and rotational speed increasing of the second electric motor taking place during a shifting operation of the second transmission arrangement out of a higher gear stage into a lower gear stage. The method according to the invention is distinguished by the fact that, during the shifting operation, a drive connection is established via a first clutch between the first electric motor and the propulsion drive, with the result that the propulsion drive is driven by the first electric motor during the shifting operation.

In the case of a shifting operation out of a higher gear stage into a lower gear stage, the first electric motor which is assigned to the propulsion drive has to increase its rotational speed very rapidly, in order to establish the rotational speed synchronization necessary for the shifting operation between the clutch elements which are involved in the shifting operation. According to the prior art, this rotational speed synchronization takes place via corresponding frictional work between the clutch elements which are involved in the shifting operation, comparatively high rotational speed differences occurring, in particular, in the case of electric motors, which disadvantageously has to be compensated for by way of particularly powerful and therefore heavy and expensive clutches. There is additionally the work which is to be done for the rotational speed acceleration of the second electric motor and is correspondingly great on account of the comparatively great mass moment of inertia and the comparatively high rotational speed difference.

This is where the method according to the invention comes into play: by it advantageously being made possible for the propulsion drive to be driven by the first electric motor which is actually assigned to the working drive during the shifting operation of the second transmission arrangement, the second electric motor can be disconnected in terms of drive from the propulsion drive, with the result that its entire providable power output can be used as far as possible to increase its own rotational speed as rapidly as possible. During this, the necessary traction force can be applied by the first electric motor, with the result that no interruption in the traction force occurs during the shifting operation.

Within the context of the invention, a shifting operation from a higher gear stage into a lower gear stage is understood to mean a shifting operation out of a gear stage which has a comparatively higher output rotational speed and a comparatively lower output torque into a gear stage which has a comparatively lower output rotational speed and a comparatively higher output torque.

The rotational speed increase of the second electric motor necessary for rotational speed synchronization can preferably be achieved by virtue of the fact that the second electric motor is disconnected briefly from the propulsion drive during the shifting operation and increases its rotational speed correspondingly during the disconnection from the propulsion drive. During the disconnection of the second electric motor, the propulsion drive is preferably driven by the first electric motor.

Conceivable and preferred are not only the provision of a single first and second electric motor, but also a plurality of first and second electric motors which can be coupled to one another, for example, via a summing transmission or can be connected to the first and second transmission arrangement, respectively, in a manner which can be released in drive terms via respective individual drive attachments.

At least the second transmission arrangement preferably comprises a multiplicity of gear stages which are configured as forward gears and at least one gear stage which is configured as a reverse gear. The number of forward gears particularly preferably corresponds to the number of reverse gears. The first transmission arrangement can also comprise more than only one gear stage which is configured as a forward gear. Moreover, one or more gear stages, configured as a reverse gear, of the first transmission arrangement are also conceivable. On account of the ability of electric motors to change their rotational direction, the provision of reverse gears is not always required, however.

In accordance with one embodiment of the invention, it is provided that the shifting operation is carried out under power. Here, in the context of the invention, the term "under power" denotes a state of the drive train, in the case of which state a torque is transmitted to the propulsion drive by the second electric motor and, during the shifting operation, also by the first electric motor, with the result that the mobile machine experiences, for example, an acceleration or carries out uphill travel at a constant speed. A shifting operation under power is therefore a shifting operation without interruption to the traction power. Without recourse to the method according to the invention, an interruption in the torque transmission would take place precisely during the shifting operation, unless recourse is made to a disadvantageously large, expensive and heavy clutch in accordance with the prior art. To this extent, the advantages of the method according to the invention are also and, above all, exhibited in the case of a shifting operation under power, since this is made possible without interruption of the traction power and in the presence of a comparatively small, inexpensive and low-performance clutch. In effect, a drive train, in which the method according to the invention is carried out, therefore achieves the same power-shift capability without an interruption in the traction force as a drive train which is provided with a comparatively large, heavy and expensive clutch.

In accordance with an embodiment of the invention, it is provided that the first electric motor drives the propulsion drive and the working drive at the same time during the shifting operation. This results in the advantage that the working drive is also not interrupted by way of the shifting operation and is continuously available. A drive connection between the first electric motor and the second transmission arrangement is established merely via the first clutch, with the result that a power demand required by the propulsion drive is provided by the first electric motor during the shifting operation in addition to the power demand of the working drive.

In accordance an embodiment of the invention, it is provided that a providable power output of the first electric motor is used to synchronize clutch halves of a clutch which is assigned to the lower gear stage. Here, that clutch half which is assigned to the drive side of the drive train is synchronized, namely accelerated. The acceleration of the clutch half requires a not insignificant expenditure of energy which can often no longer be provided by the second electric motor which after all has to accelerate its own rotational speed.

A series of further gearwheels or shafts which establish the drive connection from the first electric motor to the clutch half are also connected to the clutch half. This series of further gearwheels or shafts is preferably as far as possible identical to those gearwheels and shafts, via which the drive connection from the second electric motor to the clutch half is established after the shifting operation. Therefore, these gearwheels and shafts are advantageously also already brought to the required rotational speed by the first electric motor.

In accordance with an embodiment of the invention, it is provided that a providable power output of the second electric motor is used to increase a rotational speed of the second electric motor. By the acceleration of the clutch half taking place by way of the first electric motor, the entire power output which can be provided by the second electric motor can be used for its own rotational speed adaptation, which leads as a consequence to an overall more rapid shifting operation, since all the involved elements reach the required rotational speeds more rapidly.

As long as the second electric motor is accelerating its rotational speed to the rotational speed which is necessary for the lower gear stage to be engaged, it is preferably decoupled from the propulsion drive and also from the working drive. A small number of gearwheels or shafts which cannot be disconnected in drive terms from the second electric motor can possibly still be connected to the second electric motor, however, and can therefore be driven or accelerated by it.

In accordance with an embodiment of the invention, it is provided that the first electric motor drives the propulsion drive only to the extent that a power output difference between a power requirement of the propulsion drive and a power output which can be provided by the second electric motor during the shifting operation is bridged. This therefore means that the mechanical power output which is provided by the first electric motor during the shifting operation is increased advantageously exactly to such an extent that the propulsion drive firstly does not experience any performance restriction as a result of the shifting operation, but secondly also does not experience any unrequested performance increase. This results in the advantage that the behavior of the propulsion drive is not influenced by way of the shifting operation. A power output which is requested, for example, by an operator of the mobile machine for the propulsion drive is therefore provided in an unrestricted manner even during the shifting operation, to which end the power output which is provided by the first electric motor is increased to the same extent that the power output which is provided by the second electric motor is reduced on account of the shifting operation. An overall power output which is provided to the propulsion drive is maintained, however.

In accordance with an embodiment of the invention, it is provided that the first electric motor drives the propulsion drive only to the extent that a power requirement of the working drive can be met completely during the shifting operation. This results in the advantage that it is ensured in every case that the working drive receives the power output which is required and is requested by an operator of the mobile machine, even during the shifting operation, with the result that a decline in the power output of the working drive which is sudden and unexpected, in particular, for the operator can be avoided. A decline in the power output of the working drive which is unexpected for the operator could otherwise lead to a hazardous situation arising, for example if a lifting device, operated by the working drive, of the mobile machine no longer receives the power output which is necessary to hold a lifted load. A brief decline in the power output in the propulsion drive in contrast usually does not lead to a hazardous situation arising.

Completely meeting the power requirement of the working drive by way of the first electric motor gains significance, in particular, in situations, in which comparatively high power requirements are provided equally by the propulsion drive and by the working drive, which high power requirements, however, can no longer be provided in total by the first electric motor. If the requested overall power output therefore exceeds the maximum power output which can be provided by the first electric motor, the request of the working drive is first of all fulfilled completely. A remaining residual power output of the first electric motor which can still be provided is then made available to the propulsion drive during the shifting operation.

Furthermore, the invention relates to a drive train for a mobile machine, comprising a first electric motor and a second electric motor, and a first transmission arrangement and a second transmission arrangement, the first electric motor and the first transmission arrangement being assigned to a working drive of the mobile machine, and the second electric motor and the second transmission arrangement being assigned to a propulsion drive of the mobile machine. The drive train according to the invention is distinguished by the fact that a drive connection can be established via a first clutch between the first electric motor and the propulsion drive. The drive train according to the invention therefore advantageously comprises all the necessary devices and means, in order for it to be possible for the method according to the invention to be carried out. This in turn leads to the advantages which have already been described in conjunction with the method according to the invention.

In order to ensure as optimum performance as possible of the method according to the invention by way of the drive train according to the invention, the first electric motor and the second electric motor are preferably adapted to one another with regard to their providable power output and their torque/rotational speed characteristic curve. This means that the maximum power output which can be provided by the first electric motor is advantageously in a range of from 50% to 150% of the maximum power output which can be provided by the second electric motor, in particular in a range of from 80% to 120%. Moreover, the torque/rotational speed characteristic curve of the first electric motor is advantageously in a range of from 50% to 150% of the torque/rotational speed characteristic curve of the second electric motor, in particular in a range of from 80% to 120%.

It is particularly preferably provided that the first electric motor has a providable power output of less than 100% of the power output which can be provided by the second electric motor, but in exchange has higher dynamics, that is to say the capability for comparatively more rapid rotational speed adaptation by way of rotational speed accelerations or rotational speed reductions.

Furthermore, the drive train preferably comprises in each case a dedicated electronic power system or an individual common electronic power system for the actuation and/or regulation of the rotational speed and/or the torque and/or the power output to be provided of the first electric motor and the second electric motor. The drive train likewise preferably comprises an electronic control unit which controls or regulates the first electric motor and the second electric motor via the respective dedicated electronic power system or via the common electronic power system.

In accordance with an embodiment of the invention, it is provided that the first electric motor and the second electric motor are arranged in a common housing. This enables a space-saving and weight-saving arrangement of the first electric motor and the second electric motor within the drive train in a mobile machine. In addition, weight and costs are saved by way of the common housing in comparison with two individual housings. The first and the second electric motor can be installed, for example, axially behind one another in a common housing, it being possible, for example, for the motor output shafts to point out of the housing in opposed axial directions. An arrangement axially next to one another in a housing of corresponding configuration is also likewise possible and preferred, however, with the result that the two motor output shafts can point, for example, in the same axial direction.

In accordance with an embodiment of the invention, it is provided that the second transmission arrangement can be power-shifted via a multiplicity of gear stages. This results in the advantage that the power-shift capability which can be provided by way of the method according to the invention is ensured not only for a shifting operation from a very specific lower gear stage into a very specific higher gear stage, but rather for a multiplicity of gear stages. As a result, the drive train according to the invention becomes more flexible. This necessitates a rotational speed/torque behavior which is adapted accordingly for this purpose, and a correspondingly configured performance capability, in particular, of the first electric motor.

It is particularly preferably provided that the second transmission arrangement can be power-shifted via all the gear stages. This leads to a once again increased flexibility of the drive train according to the invention.

It is particularly preferably provided that the second transmission arrangement can be shifted via three second clutches, or can be power-shifted by means of the method according to the invention. In practical application, this has proved to be a good compromise between flexibility as a result of a multiplicity of power-shiftable gear stages on the one hand and the required space requirement, the weight and the manufacturing costs of the drive train on the other hand.

In accordance with an embodiment of the invention, it is provided that the working drive comprises at least one hydraulic pump, the hydraulic power of which can be adjusted via a swash angle. Regardless of this, the hydraulic power output can of course also be adjusted via the rotational speed of the at least one hydraulic pump and via the torque at the at least one hydraulic pump. By an additional degree of freedom for adjusting the hydraulic power output being available, however, via the swash angle, the possibility is opened up of adjusting the rotational speed and/or the torque of the first electric motor during a shifting operation largely in accordance with the requirements of the propulsion drive, because an influence of the modified rotational speed and/or the modified torque of the first electric motor on the at least one hydraulic pump can be compensated for by way of a corresponding adjustment of the swash angle.

In accordance with an embodiment of the invention, it is provided that the drive train is configured to carry out the method according to the invention.

It is preferably provided that, furthermore, the first electric motor and/or the second electric motor are/is configured to recuperate kinetic energy during braking operation of the mobile machine. Kinetic energy can namely advantageously be recuperated both by the second and also by the first electric motor as a result of the drive connection according to the invention which can be established via the first clutch between the first electric motor and the second transmission arrangement. To this end, the drive train advantageously comprises, furthermore, an electrical energy store, to which the electrical energy which is supplied by way of the recuperation operation can be fed. During recuperation operation, the first electric motor and the second electric motor operate as generators, and convert mechanical (namely kinetic) energy into electrical energy. This electrical energy can later be removed from the electrical energy store again as required, in order to supply the first electric motor and/or the second electric motor. It can additionally also be provided that the electrical energy store can be charged with external electrical energy via a charging cable or another suitable charging device, for example an induction charging device. Moreover, the use of the first electric motor and/or the second electric motor for recuperation reduces the wear of a mechanical friction brake.

Furthermore, the invention relates to a mobile machine, comprising a drive train according to the invention. The advantages which have already been described in conjunction with the drive train according to the invention also result herefrom for the mobile machine according to the invention.

In accordance with an embodiment of the invention, it is provided that the mobile machine is configured as a wheel loader.

As an alternative, the mobile machine can also preferably be configured as a dumper truck, excavator, telescopic handler or tractor.

In the following text, the invention will be described by way of example on the basis of embodiments which are shown in the figures, in which:

Identical objects, functional units and comparable components are denoted in all the figures by the same designations. These objects, functional units and comparable components are of identical configuration with regard to their technical features unless something different results explicitly or implicitly from the description.

FIG. 1 shows by way of example and diagrammatically one possible embodiment of a drive train 1 according to the invention for a mobile machine, in the form of a block diagram. The drive train 1 which is shown by way of example comprises a first electric motor 2 and a second electric motor 3, and a first transmission arrangement 4 and a second transmission arrangement 5, 5'. In accordance with the example, the first electric motor 2 and the second electric motor 3 are arranged in a common housing 11. In accordance with the example, the second transmission arrangement 5, 5' consists of a transmission stage 5 which is mounted upstream in drive terms, and a multiple-stage, power-shiftable transmission arrangement 5'. The first electric motor 2 and the first transmission arrangement 4 are assigned to a working drive 6 of the drive train 1, the working drive 6 also comprising in accordance with the example an ePTO interface 12 (electric Power Take Off interface). The second electric motor 3 and the second transmission arrangement 5 are in contrast assigned to a propulsion drive 7 of the drive train 1, the propulsion drive 7 also comprising an output shaft 13. In addition, a drive connection can be established via a first clutch 8 between the first electric motor 2 and the propulsion drive 7, the drive connection running, in accordance with the example, specifically from the first electric motor 2 to a point between the transmission stage 5 and the power-shiftable transmission arrangement 5'. By way of this drive connection, it is advantageously made possible for the propulsion drive 7 to be driven during a shifting operation of the second transmission arrangement 5 by the first electric motor 2 which is actually assigned to the working drive 6. Therefore, the second electric motor 3 can be disconnected in drive terms from the propulsion drive 7, and a rotational speed synchronization in the sense of a rotational speed increase of the second electric motor 3 can be set or adjusted, without a loss of traction power occurring in the propulsion drive 7. At the same time, the first electric motor can already synchronize or accelerate a clutch half and gear teeth and shafts which are connected to the clutch half. Accordingly, in the case of performance of the method according to the invention, it is not required for the rotational speed synchronization to be achieved by way of friction work, with the result that corresponding clutches of the second transmission arrangement 5 can be of comparatively smaller and less expensive design than is customary in the prior art.

Figure 2:
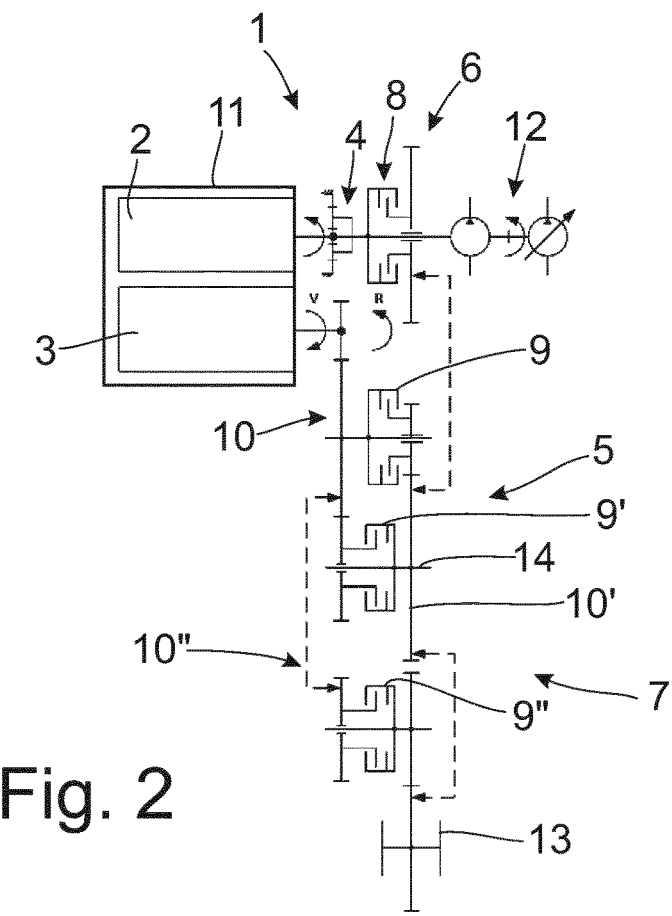
FIG. 2 shows by way of example a further possible embodiment of a drive train 1 according to the invention for a mobile machine, in the form of a gear diagram in the form of a block diagram.

FIG. 2 shows by way of example a further possible embodiment of a drive train 1 according to the invention for a mobile machine, in the form of a gear diagram. In accordance with the example, the drive train 1 of FIG. 2 comprises a first electric motor 2 and a second electric motor 3 which are arranged in a common housing 9. Furthermore, the drive train 1 of FIG. 2 comprises a first transmission arrangement 4 and a second transmission arrangement 5, the first electric motor 2 and the first transmission arrangement 4 being assigned to a working drive 6 of the drive train 1. In contrast, the second electric motor 3 and the second transmission arrangement 5 are assigned to a propulsion drive 7 of the drive train 1. A drive connection can be established via a first clutch 8 between the first electric motor 2 and the second transmission arrangement 5, it being possible in accordance with the example for the drive connection to be established from the first electric motor 2 to a shaft 14 of the second transmission arrangement 5. Therefore, the first electric motor 2 can drive the propulsion drive 7 in the case of a closed first clutch 8. In accordance with the example, furthermore, the second transmission arrangement 5 comprises three second clutches 9, 9' and 9", in order to provide three shiftable gear stages of the second transmission arrangement 5 by means of three different spur gear stages 10, 10', 10".

Figure 3:
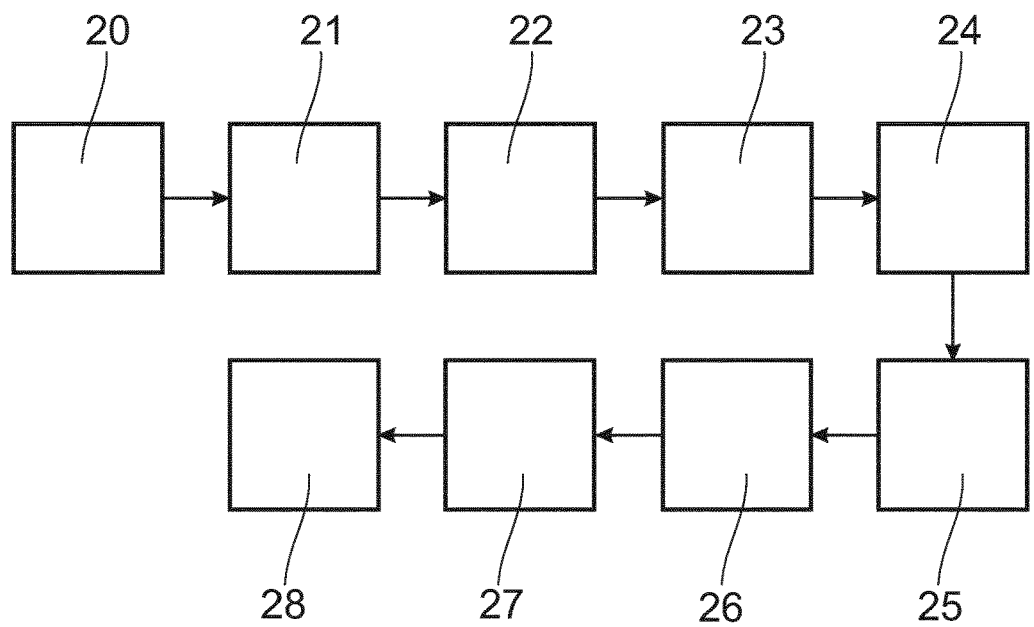
FIG. 3 shows by way of example and diagrammatically one possible embodiment of a method according to the invention for operating a drive train for a mobile machine, in the form of a flow chart.

FIG. 3 shows by way of example and diagrammatically one possible embodiment of a method according to the invention for operating a drive train 1 for a mobile machine, in the form of a flow chart. A first electric motor 2 of the drive train 1 drives a working drive 6 of the mobile machine via a first transmission arrangement 4, and a second electric motor 3 of the drive train 1 drives a propulsion drive 7 of the mobile machine via a second transmission arrangement 5. In method step 20, a switching operation out of a higher gear stage into a lower gear stage of the second transmission arrangement 5 is initiated by way of an operator of the mobile machine. The initiating of the shifting operation takes place by way of actuation of a corresponding shifting element of the mobile machine, in accordance with the example by way of a gear stage selector lever. In method step 21, a check is made by a control unit as to whether the first electric motor 2 which is assigned to the working drive 6 of the mobile machine 1 still has sufficient power reserves, in addition to driving the working drive 6, in order to assist the shifting operation. This is the case in accordance with the example, since the working drive 6 is currently not being driven. In the following method step 22, a drive connection is therefore established between the first electric motor 2 and the propulsion drive 5, which takes place by way of closing of a first clutch 8. In method step 23, the first clutch 8 is closed completely, and both the first electric motor 2 and the second electric motor 3 transmit power to the propulsion drive 7, that is to say drive the propulsion drive 7. In method step 24, the second electric motor 3 reduces its power output which is transmitted to the propulsion drive 7, the first electric motor 2 at the same time increasing its power output which is transmitted to the propulsion drive 7. Here, the increase in the transmitted power output by way of the first electric motor 2 corresponds exactly to the reduction of the transmitted power output by way of the second electric motor 3, with the result that a power output difference between a power requirement of the propulsion drive 7 and a power output which can be provided by the second electric motor 3 during the shifting operation is bridged. In the following method step 25, the second electric motor 3 reduces its power output which is transmitted to the propulsion drive 7 to zero, by a corresponding clutch being open. At the same time, the first electric motor 2 further increases its power output which is transmitted to the propulsion drive 7. The propulsion drive 7 is then driven exclusively by way of the first electric motor 2. In step 26, the second electric motor 3 then begins a rotational speed synchronization in the sense of a rotational speed increase. In accordance with the example, the rotation speed increase takes place by virtue of the fact that the second electric motor 3 has a maximum current applied to it. As soon as the necessary rotational speed increase is concluded and a rotational speed synchronization is achieved, the clutch 9', likewise involved in the shifting operation, of the second transmission arrangement 5 closes. In this way, a drive connection is again established between the second electric motor 3 and the propulsion drive 7. In method step 27, the first electric motor 2 reduces its power output which is transmitted to the propulsion drive 7, whereas the second electric motor 3 increases its power output which is transmitted to the propulsion drive 7 to the same extent. In this case, the reduction of the transmitted power output by way of the first electric motor 2 corresponds precisely to the increase of the transmitted power output by way of the second electric motor 3. Therefore, the propulsion drive 7 receives a constant power output supply. In method step 28, finally, the first electric motor 2 no longer transmits any power output to the propulsion drive 7. The propulsion drive 7 is again driven exclusively by the second electric motor 3. The first clutch 8 opens and therefore interrupts the drive connection between the first electric motor 2 and the second transmission arrangement 5 or the propulsion drive 7. The shifting operation is therefore concluded. Since power from the first electric motor 2 and/or from the second electric motor 3 has been transmitted during the entire shifting operation to the second transmission arrangement 5 and/or to the propulsion drive 7, the shifting operation has been carried out under power. The drive train 1 is therefore capable of power-shifting.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF DESIGNATIONS

1 Drive train
2 First electric motor
3 Second electric motor
4 First transmission arrangement
5 Second transmission arrangement
6 Working drive
7 Propulsion drive
8 First clutch
9, 9', 9" Second clutch
10, 10', 10" Spur gear stage
11 Common housing
12 ePTO
13 Output shaft
14 Shaft
20 Initiating of the shifting operation
21 Checking of the power reserves
22 Establishing of the drive connection
23 Complete closing of the first clutch
24 Reducing of the power of the second electric motor, increasing of the power of the first electric motor
25 Further reducing of the power of the second electric motor, further increasing of the power of the first electric motor
26 Rotational speed synchronizing of the second electric motor
27 Reducing of the power of the first electric motor, increasing of the power of the second electric motor
28 Further reducing of the power of the second electric motor, further increasing of the power of the first electric motor

The invention claimed is:
1. A method for operating a drive train for a mobile machine, comprising:
driving, via a first electric motor, a working drive of the mobile machine via a first transmission arrangement; and
driving, via a second electric motor, a propulsion drive of the mobile machine via a second transmission arrangement; wherein:
a rotational speed of the second electric motor increases during a shifting operation of the second transmission arrangement out of a higher gear stage into a lower gear stage,
during the shifting operation, a drive connection is established via a first clutch between the first electric motor and the propulsion drive, such that the propulsion drive is driven by the first electric motor during the shifting operation, and
the first electric motor drives the propulsion drive only to the extent that a power output difference between a power requirement of the propulsion drive and a power output which can be provided by the second electric motor during the shifting operation is bridged.

2. The method as claimed in claim 1, wherein the shifting operation is carried out under power.

3. The method as claimed in claim 1, wherein the first electric motor drives the propulsion drive and the working drive at the same time during the shifting operation.

4. The method as claimed in claim 1, wherein a providable power output of the first electric motor is configured to synchronize clutch halves of a clutch which is assigned to the lower gear stage.

5. The method as claimed in claim 1, wherein a providable power output of the second electric motor is configured to increase a rotational speed of the second electric motor.

6. The method as claimed in claim 1, wherein the first electric motor drives the propulsion drive only to the extent that a power requirement of the working drive can be met completely during the shifting operation.

7. A drive train for a mobile machine, comprising:
a first electric motor;
a second electric motor;
a first transmission arrangement; and
a second transmission arrangement, wherein:
the first electric motor and the first transmission arrangement are assigned to a working drive of the mobile machine,
the second electric motor and the second transmission arrangement are assigned to a propulsion drive of the mobile machine,
a drive connection is established via a first clutch between the first electric motor and the propulsion drive,
a rotational speed of the second electric motor increases during a shifting operation of the second transmission arrangement out of a higher gear stage into a lower gear stage,
during the shifting operation, the drive connection is established via the first clutch between the first electric motor and the propulsion drive, such that the propulsion drive is driven by the first electric motor during the shifting operation, and
the first electric motor drives the propulsion drive only to the extent that a power output difference between a power requirement of the propulsion drive and a power output which can be provided by the second electric motor during the shifting operation is bridged.

8. The drive train as claimed in claim 7, wherein the first electric motor and the second electric motor are arranged in a common housing.

9. The drive train as claimed in claim 7, wherein the second transmission arrangement can be power-shifted via a plurality of gear stages.

10. The drive train as claimed in claim 7, wherein the working drive comprises at least one hydraulic pump providing hydraulic power which can be adjusted via a swash angle.

11. The drive train as claimed in claim 7, wherein the drive train is configured to:
drive, via the first electric motor, the working drive of the mobile machine via the first transmission arrangement; and
drive, via the second electric motor, the propulsion drive of the mobile machine via the second transmission arrangement.

12. A mobile machine, comprising the drive train as claimed in claim 8.

13. A method for operating a drive train for a mobile machine, comprising:
- driving, via a first electric motor, a working drive of the mobile machine via a first transmission arrangement; and
- driving, via a second electric motor, a propulsion drive of the mobile machine via a second transmission arrangement; wherein:
    - a rotational speed of the second electric motor increases during a shifting operation of the second transmission arrangement out of a higher gear stage into a lower gear stage,
    - during the shifting operation, a drive connection is established via a first clutch between the first electric motor and the propulsion drive, such that the propulsion drive is driven by the first electric motor during the shifting operation, and
    - during the shifting operation, the second electric motor is temporarily disconnected from the propulsion drive.

14. The method of claim 13, wherein the second electric motor is temporarily disconnected from the propulsion drive via a second clutch during the shifting operation.

15. The method of claim 14, wherein the second electric motor is connected to the propulsion drive via a third clutch after the shifting operation.

\* \* \* \* \*